United States Patent
Ohno

(10) Patent No.: US 10,906,501 B2
(45) Date of Patent: Feb. 2, 2021

(54) OCCUPANT RESTRAINT DEVICE FOR VEHICLE

(71) Applicant: TOYOTA JIDOSHA KABUSHIKI KAISHA, Toyota (JP)

(72) Inventor: Mitsuyoshi Ohno, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 125 days.

(21) Appl. No.: 16/125,219

(22) Filed: Sep. 7, 2018

(65) Prior Publication Data
US 2019/0106079 A1    Apr. 11, 2019

(30) Foreign Application Priority Data
Oct. 10, 2017  (JP) .................................. 2017-196650

(51) Int. Cl.
*B60R 22/26* (2006.01)
*B60R 22/02* (2006.01)
(Continued)

(52) U.S. Cl.
CPC .............. *B60R 22/023* (2013.01); *B60N 2/42* (2013.01); *B60R 22/00* (2013.01); *B60R 22/26* (2013.01);
(Continued)

(58) Field of Classification Search
CPC ...... B60R 2022/006; B60R 2022/1843; B60R 22/26; B60N 2/688
See application file for complete search history.

(56) References Cited

U.S. PATENT DOCUMENTS 4,431,233 A * 2/1984 Ernst ...................... B60R 22/26
                                                                280/801.1
5,294,183 A * 3/1994 Wetter ..................... B60R 22/14
                                                                297/216.11
(Continued)

FOREIGN PATENT DOCUMENTS

JP         S63-104159 U    7/1988
JP         2000-142303 A   5/2000
(Continued)

OTHER PUBLICATIONS

Nov. 24, 2020 Office Action issued in Japanese Patent Application No. 2017-196650.

*Primary Examiner* — James A English
(74) *Attorney, Agent, or Firm* — Oliff PLC

(57) ABSTRACT

An occupant restraint device for a vehicle includes a three-point seatbelt device, a shoulder cover, an attachment portion, and a hard pad provided inside the shoulder cover. The three-point seatbelt device includes a shoulder belt that extends from an upper portion at a seat width direction one end side of a seat back toward a buckle at a lower portion at the seat width direction other end side. The shoulder cover is provided at the upper portion at the seat width direction one end side of the seat back. The shoulder belt is inserted through the shoulder cover, and the shoulder cover is arranged along a restrained surface of the vehicle occupant sitting on a vehicle seat. At the attachment portion, a side of the shoulder cover at which a terminal portion thereof is disposed is attached to the upper portion at the seat width direction one end side of the seat back so as to be relatively movable in an up-and-down direction with respect to the upper portion. The hard pad is disposed between the vehicle occupant sitting on the vehicle seat and the shoulder belt in a region opposing a collarbone of the vehicle occupant.

16 Claims, 13 Drawing Sheets

(51) Int. Cl.
  *B60N 2/42* (2006.01)
  *B60R 22/00* (2006.01)
  *B60R 22/18* (2006.01)
(52) U.S. Cl.
  CPC . *B60R 2022/006* (2013.01); *B60R 2022/1843* (2013.01)

(56) References Cited

U.S. PATENT DOCUMENTS

| | | | | |
|---|---|---|---|---|
| 9,694,783 | B2* | 7/2017 | Haas | B60R 22/024 |
| 2003/0159258 | A1* | 8/2003 | Wetter | B60N 2/2812 |
| | | | | 24/633 |
| 2004/0061323 | A1* | 4/2004 | Xu | B60R 22/26 |
| | | | | 280/801.1 |
| 2006/0103229 | A1* | 5/2006 | Fransen | B60N 2/2812 |
| | | | | 297/484 |
| 2008/0100122 | A1* | 5/2008 | Bell | B60R 22/26 |
| | | | | 297/468 |
| 2014/0312677 | A1* | 10/2014 | Bostrom | B60N 2/688 |
| | | | | 297/464 |
| 2015/0291064 | A1* | 10/2015 | Mitsuo | B60N 2/265 |
| | | | | 297/256.15 |
| 2015/0298647 | A1* | 10/2015 | Mitsuo | B60N 2/2812 |
| | | | | 297/256.15 |

FOREIGN PATENT DOCUMENTS

| | | |
|---|---|---|
| JP | 2004-075015 A | 3/2004 |
| JP | 2010-036836 A | 2/2010 |
| JP | 2014-104943 A | 6/2014 |
| JP | 2015-123915 A | 7/2015 |
| JP | 2018-034559 A | 3/2018 |
| JP | 2018-047790 A | 3/2018 |

\* cited by examiner

OCCUPANT RESTRAINT DEVICE FOR VEHICLE

CROSS-REFERENCE TO RELATED APPLICATION

This application is based upon and claims the benefit of priority of the prior Japanese Patent Application No. 2017-196650, filed on Oct. 10, 2017, the entire contents of which are incorporated herein by reference.

FIELD

The embodiments discussed herein are related to an occupant restraint device for a vehicle.

BACKGROUND

Patent Reference 1 (Japanese Patent Application Laid-Open (JP-A) No. 2015-123915) discloses an air belt device that inflates a bag (for example, an air belt) mounted in a shoulder belt during an emergency, widens a restrained range of the chest area of a vehicle occupant, and absorbs pressure applied to the vehicle occupant at a shoulder area that, among the bones of the body, has relatively high strength. Thus, the air belt device moderates an impact on the vehicle occupant.

A structure is recited in Patent Reference 2 (JP-A No. 2004-075015) in which a chest protection member is provided at a portion of a shoulder belt that corresponds with the chest area of a vehicle occupant. In addition, a pad material that varies in stiffness in accordance with a distribution of stiffness of the chest area of the vehicle occupant is disposed at the chest protection member. Further, a structure is recited in Patent Reference 3 (JP-A No. 2000-142303) in which an airbag is provided at a shoulder belt portion that is disposed at a passenger compartment outer side of the head area of a vehicle occupant. The airbag is a separate body from the seatbelt and is relatively movable with respect to the seatbelt.

In the structure recited in Patent Reference 1 (JP-A No. 2015-123915), a bag that is integral with a seatbelt (for example the air belt) may actively transmit a belt load to the collarbone of a vehicle occupant. However, the position of the shoulder area varies depending on a sliding position of the vehicle seat according to a seat sliding device, the physique of the vehicle occupant and so forth. Consequently, the bag may be behind the shoulder area of the vehicle occupant or in a state in which the bag presses against the chest area of the vehicle occupant. In, for example, a state in which the bag presses against the chest area of the vehicle occupant, a proportion of a load applied to the torso of the vehicle occupant that is applied to the ribs in the chest area, which have lower endurance than the collarbone in the shoulder area, may be high. As a result, there is a risk of deformation of the ribs in the chest area of the vehicle occupant (referred to below as "chest deflection"). Thus, there is scope for improvement.

SUMMARY

In consideration of the circumstances described above, an object of the present disclosure is to provide an occupant restraint device for a vehicle that may moderate an applied load acting on the ribs of a vehicle occupant from a shoulder belt side during a frontal collision.

An occupant restraint device for a vehicle according to a first aspect includes: a three-point seatbelt device including a shoulder belt that extends from an upper portion at a seat width direction one end side of a seat back toward a buckle at a lower portion at a seat width direction other end side of the seat back, the seat back structuring a vehicle seat on which a vehicle occupant is to sit; a shoulder cover provided at the upper portion at the seat width direction one end side of the seat back, the shoulder belt being inserted through the shoulder cover, and the shoulder cover being arranged along a restrained surface of the vehicle occupant sitting on the vehicle seat; an attachment portion at which a side of the shoulder cover at which a terminal portion thereof is disposed is attached to the upper portion at the seat width direction one end side of the seat back so as to be relatively movable in an up-and-down direction with respect to the upper portion; and a hard pad provided inside the shoulder cover, the hard pad being disposed between the vehicle occupant sitting on the vehicle seat and the shoulder belt in a region opposing a collarbone of the vehicle occupant.

According to the occupant restraint device for a vehicle recited in the first aspect, the shoulder belt of the three-point seatbelt device extends toward the buckle at the lower portion at the seat width direction other end side of the seat back from the upper portion at the seat width direction one end side. The shoulder cover that is inserted through the shoulder belt and arranged along the restrained surface of the vehicle occupant is provided at the upper portion at the seat width direction one end side of the seat back. The terminal portion side of the shoulder cover is attached by the attachment portion so as to be relatively movable in the up-and-down direction with respect to the upper portion at the seat width direction one end side of the seat back. Therefore, in a state in which a vehicle occupant sitting on the vehicle seat is restrained by the three-point seatbelt device (that is, when the vehicle occupant is wearing the seatbelt), the terminal portion side of the shoulder cover relatively moves in the up-and-down direction with respect to the upper portion at the seat width direction one end side of the seat back to adjust to the physique of the vehicle occupant. As a result, the shoulder cover is disposed at a location that corresponds with the shoulder area of the vehicle occupant.

The hard pad is disposed inside the shoulder cover, between the vehicle occupant and the shoulder belt in the region opposing the collarbone of the vehicle occupant sitting on the vehicle seat. Therefore, during a frontal collision, a load on the vehicle occupant from the shoulder belt may be transmitted to the collarbone that has high endurance via the hard pad, and a load on the ribs that have relatively lower endurance than the collarbone may be moderated. Consequently, an occurrence of chest deflection (in other words, rib deflection) may be suppressed. In addition, a load may continue to be transmitted to the collarbone of the vehicle occupant until a latter half of the collision, regardless of a sliding position of the vehicle seat according to a seat sliding device, the physique of the vehicle occupant and so forth.

In an occupant restraint device for a vehicle according to a second aspect, in the occupant restraint device for a vehicle according to the first aspect, a soft pad is provided inside the shoulder cover, the soft pad being disposed at least between the vehicle occupant sitting on the vehicle seat and the hard pad, and the soft pad being softer than the hard pad.

According to the occupant restraint device for a vehicle recited in the second aspect, the soft pad that is softer than the hard pad is provided inside the shoulder cover, at least between the vehicle occupant sitting on the vehicle seat and the hard pad. Thus, because the soft pad is interposed between the vehicle occupant and the hard pad, comfort while the vehicle occupant is wearing the seatbelt is improved.

In an occupant restraint device for a vehicle according to a third aspect, in the occupant restraint device for a vehicle according to the second aspect, the soft pad is elongated along the shoulder belt in a thickness direction of the shoulder cover so as to cover a side of the shoulder belt at which a shoulder area of the vehicle occupant sitting on the vehicle seat is disposed.

According to the occupant restraint device for a vehicle recited in the third aspect, the soft pad is elongated in the thickness direction of the shoulder cover so as to cover the side of the shoulder belt at which the shoulder area of the vehicle occupant is disposed along the shoulder belt. Therefore, because the soft pad is interposed in the thickness direction of the shoulder cover at the shoulder area of the vehicle occupant, comfort while the vehicle occupant is wearing the seatbelt is further improved.

In an occupant restraint device for a vehicle according to a fourth aspect, in the occupant restraint device for a vehicle according to the second aspect, the soft pad is elongated along the shoulder belt in a width direction of the shoulder cover so as to cover a side of the shoulder belt at which a neck of the vehicle occupant sitting on the vehicle seat is disposed.

According to the occupant restraint device for a vehicle recited in the fourth aspect, the soft pad is elongated in the width direction of the shoulder cover so as to cover the side of the shoulder belt at which the neck of the vehicle occupant sitting on the vehicle seat is disposed along the shoulder belt. Therefore, because the soft pad is interposed in the width direction of the shoulder cover at the neck of the vehicle occupant, comfort while the vehicle occupant is wearing the seatbelt is further improved.

In an occupant restraint device for a vehicle according to a fifth aspect, in the occupant restraint device for a vehicle according to the first aspect, the attachment portion includes a slide plate at which the terminal portion of the shoulder cover is fixed to be slidable in the up-and-down direction with respect to the seat back.

According to the occupant restraint device for a vehicle recited in the fifth aspect, the attachment portion includes the slide plate, and the terminal portion of the shoulder cover is fixed by the slide plate to be slidable in the up-and-down direction relative to the seat back. Therefore, when the vehicle occupant puts on the seatbelt, the terminal portion of the shoulder cover slides in the up-and-down direction relative to the seat back to adjust to the physique of the vehicle occupant, and the shoulder cover is disposed at a location that opposes the shoulder area of the vehicle occupant. Thus, the shoulder cover may be set to a location suitable for restraint of the vehicle occupant (that is, a location at which the hard pad opposes the collarbone of the vehicle occupant) by a simple structure.

In an occupant restraint device for a vehicle according to a sixth aspect, in the occupant restraint device for a vehicle according to the first aspect, the attachment portion fixes the side of the shoulder cover at which the terminal portion is disposed to the upper portion at the seat width direction one end side of the seat back via a member that is more extensible than the shoulder cover.

According to the occupant restraint device for a vehicle recited in the sixth aspect, the terminal portion side of the shoulder cover is fixed to the upper portion at the seat width direction one end side of the seat back via the extensible member that is more extensible than the shoulder cover. Therefore, when the vehicle occupant puts on the seatbelt, the extensible member extends to adjust to the physique of the vehicle occupant and the shoulder cover is disposed at a location opposing the shoulder area of the vehicle occupant. Thus, the shoulder cover may be set to a location suitable for restraint of the vehicle occupant (that is, a location at which the hard pad opposes the collarbone of the vehicle occupant) by a simple structure.

In an occupant restraint device for a vehicle according to a seventh aspect, in the occupant restraint device for a vehicle according to the first aspect, the hard pad includes plural slits arrayed in a length direction of the shoulder belt so as to be capable of inflecting along the vehicle occupant sitting on the vehicle seat.

According to the occupant restraint device for a vehicle recited in the seventh aspect, the hard pad is provided with the plural slits arrayed in the length direction of the shoulder belt. Consequently, the hard pad inflects along the vehicle occupant sitting on the vehicle seat and the hard pad closely fits to the vehicle occupant. Thus, the hard pad is more assuredly disposed in a region opposing the collarbone of the vehicle occupant, in addition to which fitting performance of the seatbelt is improved.

In an occupant restraint device for a vehicle according to an eighth aspect, in the occupant restraint device for a vehicle according to the first aspect, the hard pad is plurally divided in a length direction of the shoulder belt so as to be capable of inflecting along the vehicle occupant sitting on the vehicle seat.

According to the occupant restraint device for a vehicle recited in the eighth aspect, the hard pad is plurally divided in the length direction of the shoulder belt. Consequently, the hard pad inflects along the vehicle occupant sitting on the vehicle seat and the hard pad closely fits to the vehicle occupant. Thus, the hard pad is more assuredly disposed in a region opposing the collarbone of the vehicle occupant, in addition to which fitting performance of the seatbelt is improved.

In an occupant restraint device for a vehicle according to a ninth aspect, in the occupant restraint device for a vehicle according to the seventh aspect, the plural slits are provided at a side of the hard pad at which the vehicle occupant sitting on the vehicle seat is disposed, and a width of each slit in the length direction of the shoulder belt gradually increases from a side thereof at which the shoulder belt is disposed toward a side thereof at which the vehicle occupant sitting on the vehicle seat is disposed.

According to the occupant restraint device for a vehicle recited in the ninth aspect, the plural slits are provided in the side of the hard pad at which the vehicle occupant sitting on the vehicle seat is disposed. The widths of the slits in the length direction of the shoulder belt gradually increase from the side at which the shoulder belt is disposed toward the side at which the vehicle occupant is disposed. Therefore, the hard pad easily inflects along the vehicle occupant sitting on the vehicle seat by deforming such that the widths of the plural slits decrease, and fitting performance of the seatbelt is further improved.

According to the occupant restraint device for a vehicle according to the present disclosure, an applied load acting on the ribs of a vehicle occupant from a shoulder belt side during a frontal collision may be moderated.

DESCRIPTION OF EMBODIMENTS

Figure 1:
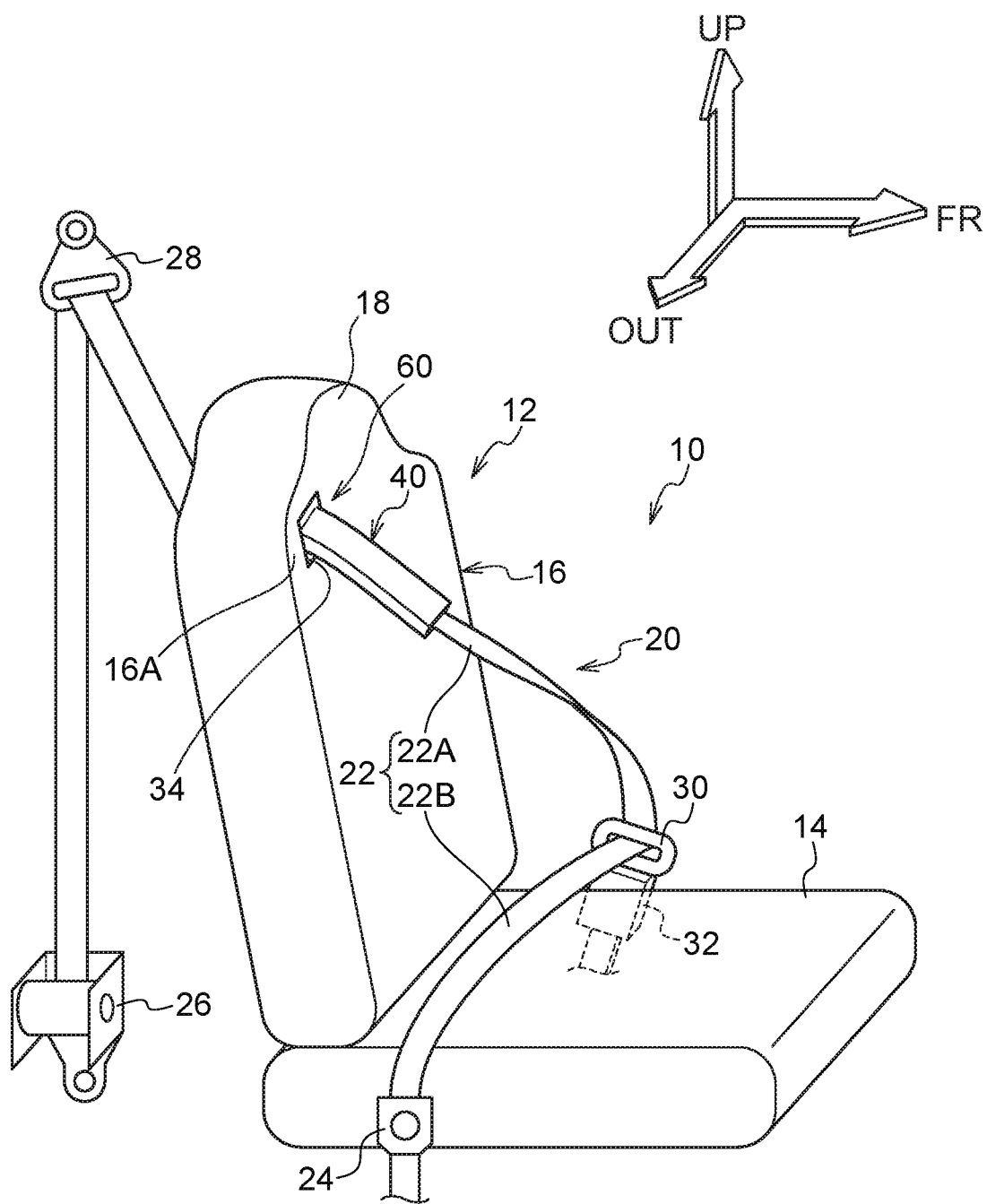
FIG. 1 is a schematic perspective view showing a vehicle seat at which an occupant restraint device for a vehicle according to a first exemplary embodiment is provided.

An exemplary embodiment of the present disclosure is described in detail in accordance with the drawings. An arrow FR that is shown as appropriate in these drawings indicates a vehicle front side, an arrow UP indicates a vehicle upper side, and an arrow OUT indicates a vehicle width direction outer side. In the exemplary embodiment of the present disclosure, a seat front direction, seatbelt width direction and seat upper direction substantially match, respectively, a vehicle front direction, vehicle width direction and vehicle upper direction, and are accordingly recited as being equivalent to the vehicle front direction, vehicle width direction and vehicle upper direction.

First Exemplary Embodiment

An occupant restraint device for a vehicle according to a first exemplary embodiment of the present disclosure is described using FIG. 1 to FIG. 6. The drawings are schematic drawings; parts that have little relevance to the present disclosure are not shown in the drawings. A vehicle occupant P, who is described below, is not shown in FIG. 1.

—Structure of the Occupant Restraint Device for a Vehicle—

As shown in FIG. 1, in an automobile according to the first exemplary embodiment, an occupant restraint device for a vehicle 10 is provided at a vehicle seat 12 at a driver seat side (below referred to simply as "the seat"), which is at the right side of vehicle front seats in a cabin.

The seat 12 includes a seat cushion 14, a seat back 16 at a rear end portion of the seat cushion 14, and a headrest 18 disposed at an upper end portion of the seat back 16. A vehicle occupant sits on the seat cushion 14, the seat back 16 supports the back area of the seated vehicle occupant, and the headrest 18 supports the head area of the seated vehicle occupant. In the first exemplary embodiment, only a portion of the headrest 18 is illustrated. The headrest 18 is provided integrally with the seat back 16 in the first exemplary embodiment, but the headrest 18 may be provided as a separate body from the seat back 16.

A belt guide 34 is formed at a vehicle width direction outer side of a front face 16A at an upper portion of the seat back 16. A seatbelt 22 that is described below (for example, a webbing) is inserted through and guided by the belt guide 34.

A seatbelt device 20, known as a "three-point seatbelt device", is provided at the seat 12. The seatbelt device 20 is provided with the seatbelt 22 and an anchor plate 24 that anchors one end of the seatbelt 22. The seatbelt device 20 is further provided with a retractor 26 and a shoulder anchor 28. Another end of the seatbelt 22 is anchored at the retractor 26, and the retractor 26 features a pretensioner function that applies a predetermined tension to the seatbelt 22. The shoulder anchor 28 is at an upper portion at the vehicle width direction outer side of the seat 12 (for example, a pillar). The seatbelt 22 is folded back toward the retractor 26 at the shoulder anchor 28. The seatbelt device 20 is still further provided with a buckle 32 at which a tongue plate 30, through which the seatbelt 22 is inserted, is fixed by engaging with the buckle 32.

A portion of the seatbelt 22 between the shoulder anchor 28 and the buckle 32 is referred to as a shoulder belt portion 22A (which is an example of a shoulder belt) and a portion of the seatbelt 22 between the buckle 32 and the anchor plate 24 is referred to as a lap belt portion 22B.

Figure 2:
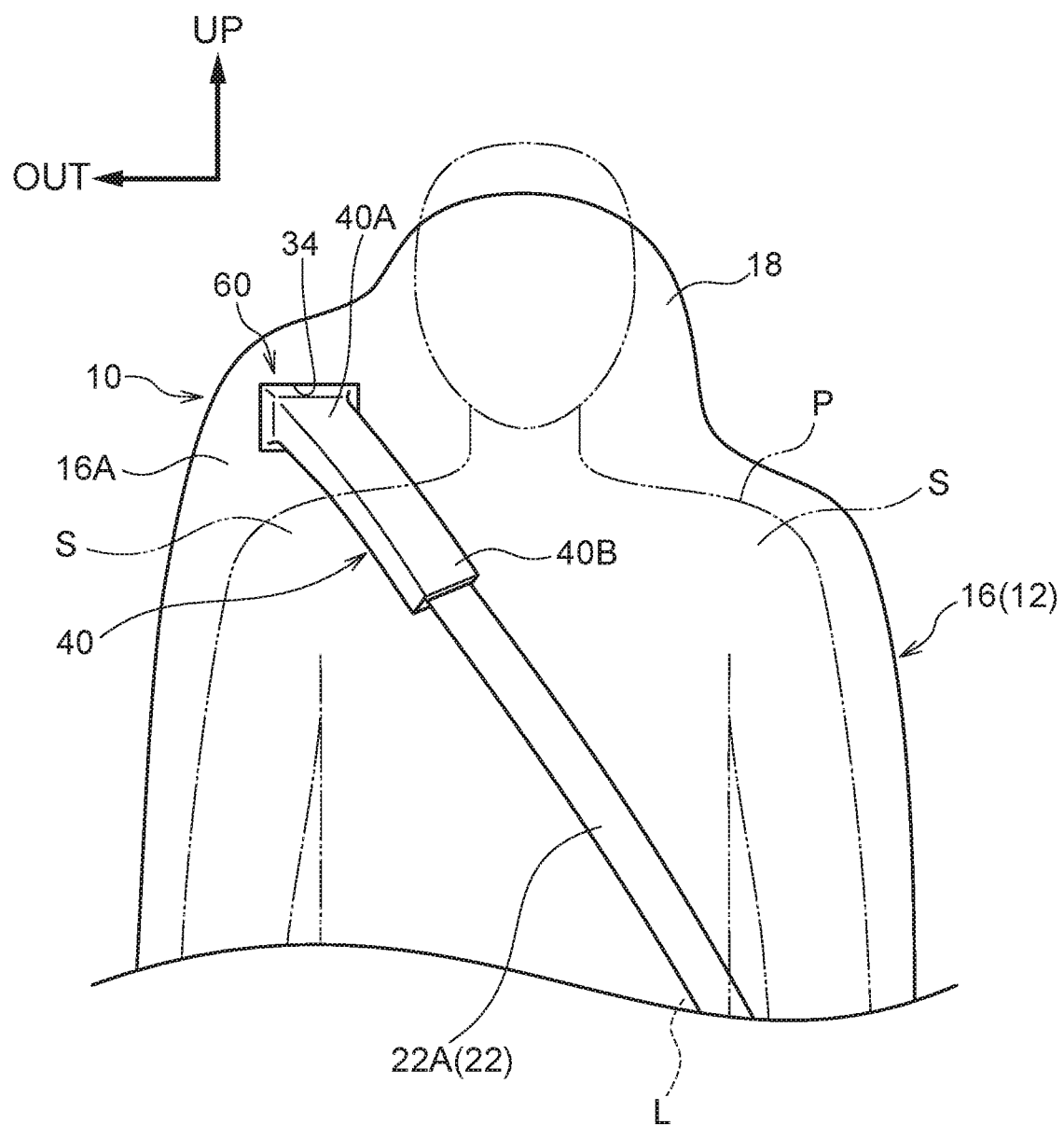
FIG. 2 is a front view showing a state in which a vehicle occupant sitting on the vehicle seat is restrained by the occupant restraint device for a vehicle according to the first exemplary embodiment.

As shown in FIG. 2, the shoulder belt portion 22A extends from a shoulder area S at an upper portion at the vehicle width direction outer side of a vehicle occupant P sitting on the seat 12 toward a lap area L at a lower portion at the vehicle width direction inner side of the vehicle occupant P, and the shoulder belt portion 22A restrains the vehicle occupant P from the front. Herein, the vehicle width direction outer side of the seat 12 is an example of a seat width direction one end side, and the vehicle width direction inner side of the seat 12 is an example of a seat width direction other end side.

Figure 3:
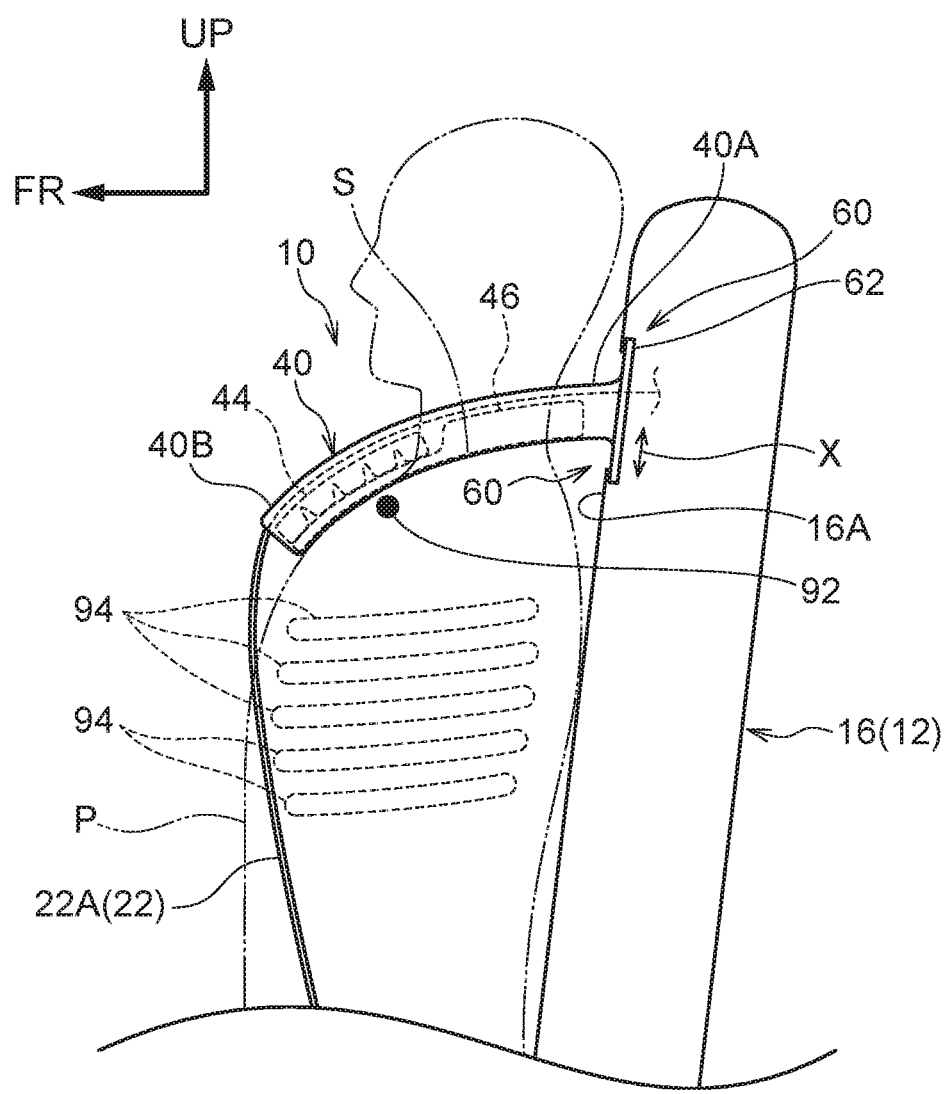
FIG. 3 is a side view showing the state in which the occupant sitting on the vehicle seat is restrained by the occupant restraint device for a vehicle according to the first exemplary embodiment.

As shown in FIG. 1 to FIG. 3, the occupant restraint device for a vehicle 10 is provided with a shoulder cover 40 at an upper portion at the vehicle width direction outer side of the seat back 16. The shoulder belt portion 22A is inserted through the shoulder cover 40, and the shoulder cover 40 is arranged along a restrained surface of the vehicle occupant P sitting on the seat 12 (see FIG. 2 and FIG. 3). That is, the shoulder cover 40 extends from the upper side at the vehicle width direction outer side of the seat back 16 diagonally toward the lower side at the vehicle width direction inner side of the seat back 16. An upper end portion 40A of the shoulder cover 40 serves as a terminal portion at the vehicle width direction outer side of the shoulder cover 40. The occupant restraint device for a vehicle 10 is provided with an attachment portion 60 at which a side of the shoulder cover 40 at which the upper end portion 40A is disposed is attached so as to be relatively movable in the up-and-down direction (for example, the direction of arrow X in FIG. 3) with respect to the front face 16A of the upper portion at the vehicle width direction outer side of the seat back 16. The attachment portion 60 is described below.

A lower end portion 40B at the vehicle width direction inner side of the shoulder cover 40 is disposed at a location that opposes a lower portion of the shoulder area S of the vehicle occupant P sitting on the seat 12. That is, the lower end portion 40B at the vehicle width direction inner side of the shoulder cover 40 is disposed at the upper side relative to ribs 94 of the vehicle occupant P sitting on the seat 12 (see FIG. 3).

Figure 4:
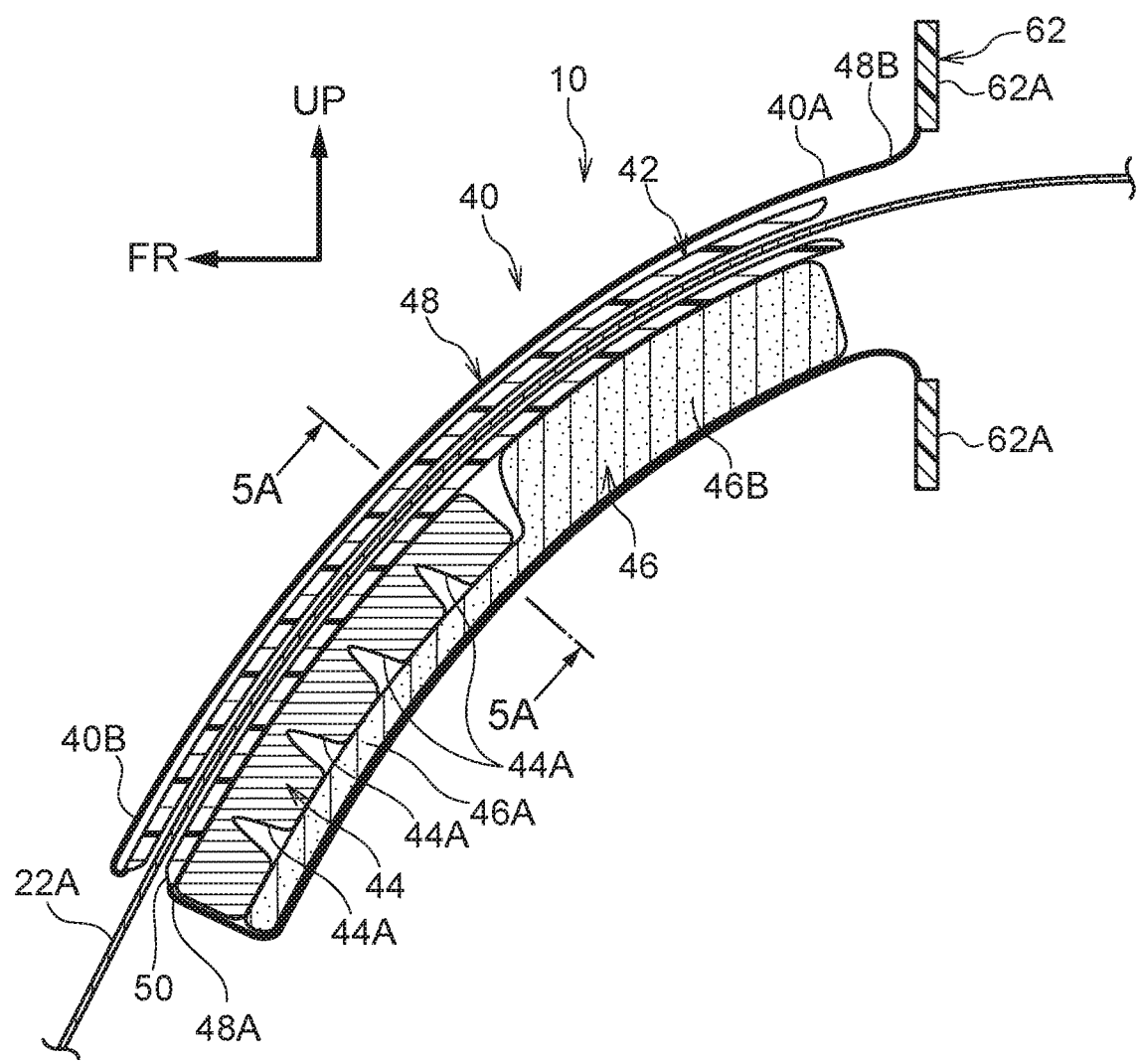
FIG. 4 is a magnified sectional diagram, cut along a length direction of a shoulder belt, showing a shoulder cover that is employed in the occupant restraint device for a vehicle according to the first exemplary embodiment.
Figure 5:
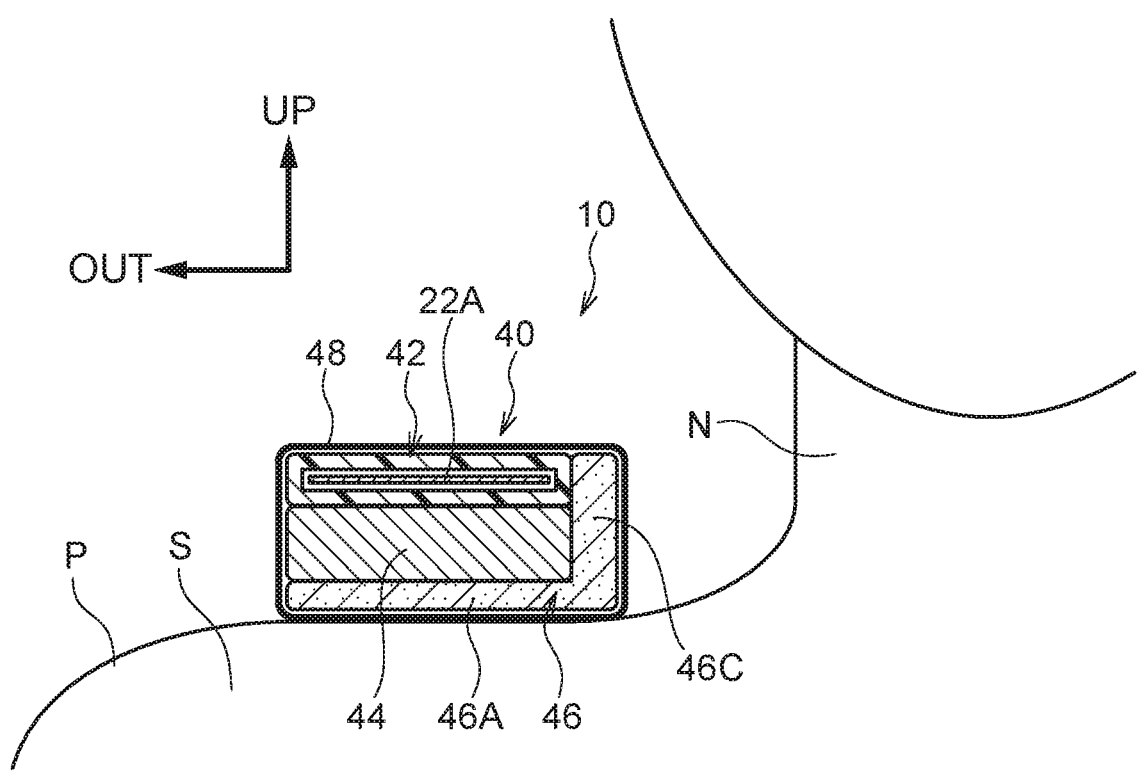
FIG. 5 is a sectional diagram showing the shoulder cover that is employed in the occupant restraint device for a vehicle according to the first exemplary embodiment, cut along line 5A-5A in FIG. 4.

As shown in FIG. 4 and FIG. 5, a tube-shaped belt insertion portion 42 and a hard pad 44 are provided inside the shoulder cover 40. The shoulder belt portion 22A is inserted through the belt insertion portion 42. The hard pad 44 is disposed between the vehicle occupant P sitting on the seat 12 and the shoulder belt portion 22A (which is to say, the belt insertion portion 42). The hard pad 44 is arranged from an intermediate portion to a front side region of the shoulder cover 40 substantially in the vehicle front-and-rear direction. The hard pad 44 is disposed in a region opposing a collarbone 92 of the vehicle occupant P sitting on the seat 12 (see FIG. 3). A soft pad 46 that is softer than the hard pad 44 is also provided inside the shoulder cover 40. The soft pad 46 is disposed at least between the vehicle occupant P sitting on the seat 12 and the hard pad 44.

More specifically, the soft pad 46 is provided with a main body portion 46A that is interposed between the vehicle occupant P sitting on the seat 12 and the hard pad 44. The soft pad 46 is further provided with a rear side elongated portion 46B (see FIG. 4) that is elongated in the thickness direction of the shoulder cover 40 along the shoulder belt portion 22A from the main body portion 46A, so as to cover a side of the shoulder belt portion 22A at which the shoulder area S of the vehicle occupant P sitting on the seat 12 is disposed. The soft pad 46 is still further provided with an inner side elongated portion 46C (see FIG. 5) that is elongated in the width direction of the shoulder cover 40 along the shoulder belt portion 22A from the main body portion 46A, so as to cover the side of the shoulder belt portion 22A at which the neck N of the vehicle occupant P sitting on the seat 12 is disposed.

The shoulder cover 40 is further provided with a cover 48 that encloses the belt insertion portion 42, the hard pad 44 and the soft pad 46. An aperture portion 50 through which the shoulder belt portion 22A is inserted (see FIG. 4) is provided at a lower end portion 48A of the cover 48. An upper end portion 48B of the cover 48 extends diagonally toward the rear side to the vehicle upper side. The upper end portion 48B of the cover 48 is fixed to a slide plate 62 that structures a portion of the attachment portion 60 (see FIG. 4).

In a sectional view cut in a direction orthogonal to a length direction of the shoulder belt portion 22A, the belt insertion portion 42 is formed in a substantially rectangular tube shape (see FIG. 5). The belt insertion portion 42 is arranged so as to enclose the shoulder belt portion 22A, and the shoulder belt portion 22A inserted through the belt insertion portion 42 can slide along the length direction thereof (see FIG. 4). The belt insertion portion 42 is formed of, for example, a low-friction resin. Frictional resistance of the belt insertion portion 42 is lowered to enable smooth pull-out and take-up of the shoulder belt portion 22A.

The hard pad 44 is structured by a single body along the shoulder belt portion 22A. The hard pad 44 is provided with plural slits 44A arrayed in the length direction of the shoulder belt portion 22A at the side of the shoulder belt portion 22A at which the vehicle occupant P sitting on the seat 12 is disposed (that is, the opposite side of the shoulder belt portion 22A from the side thereof at which the belt insertion portion 42 is disposed). Each slit 44A is formed in, for example, an inverted "V" shape such that a width of the slit 44A (that is, a width thereof along the length direction of the shoulder belt portion 22A) gradually increases toward the side at which the vehicle occupant P is disposed relative to the width at the side at which the belt insertion portion 42 is disposed. Because the plural slits 44A are provided in the hard pad 44, the hard pad 44 easily inflects along the restrained surface of the vehicle occupant P sitting on the seat 12.

The hard pad 44 is formed of a material that is harder than the soft pad 46, for example, being formed of a resin. The hard pad 44 may, for example, be joined to the belt insertion portion 42 by adhesion or the like such that a position of the hard pad 44 inside the shoulder cover 40 does not shift. As mentioned above, the hard pad 44 is disposed in a region that opposes the collarbone 92 of the vehicle occupant P sitting on the seat 12. Therefore, during a frontal collision, the hard pad 44 transmits a load to the collarbone 92 of the vehicle occupant P but is unlikely to press against the ribs 94 of the vehicle occupant P.

As described above, the soft pad 46 is provided with the main body portion 46A, the rear side elongated portion 46B and the inner side elongated portion 46C. The rear side elongated portion 46B is thicker than a thickness of the main body portion 46A in the thickness direction of the shoulder cover 40 (see FIG. 4). In the first exemplary embodiment, the rear side elongated portion 46B is formed with substantially the same thickness along the length direction of the shoulder belt portion 22A. An upper portion of the rear side elongated portion 46B touches against the belt insertion portion 42. The soft pad 46 is formed of a material that is softer than the hard pad 44, for example, being formed of a foam resin. The soft pad 46 may, for example, be joined to the belt insertion portion 42 by adhesion or the like, such that a position of the soft pad 46 inside the shoulder cover 40 does not shift.

The inner side elongated portion 46C is elongated from the main body portion 46A so as to wrap round to the vehicle width direction inner side of the hard pad 44 and belt insertion portion 42 (see FIG. 5).

In the shoulder cover 40, because the main body portion 46A of the soft pad 46 is interposed between the vehicle occupant P sitting on the seat 12 and the hard pad 44, comfort when the vehicle occupant P is wearing the seatbelt 22 can be improved. Furthermore, the rear side elongated portion 46B of the soft pad 46 is interposed between the belt insertion portion 42 and the shoulder area S of the vehicle occupant P in the thickness direction of the shoulder cover 40, and the inner side elongated portion 46C of the soft pad 46 is interposed between the belt insertion portion 42 and the neck N of the vehicle occupant P in the width direction of the shoulder cover 40. Thus, comfort when the vehicle occupant P is wearing the seatbelt 22 can be improved.

The cover 48 is formed of, for example, a cloth in which fibers are woven or a soft resin. The cover 48 prevents or suppresses rubbing against the vehicle occupant P. In the first exemplary embodiment, the cover 48 is formed of a material that is resistant to stretching.

Figure 6:
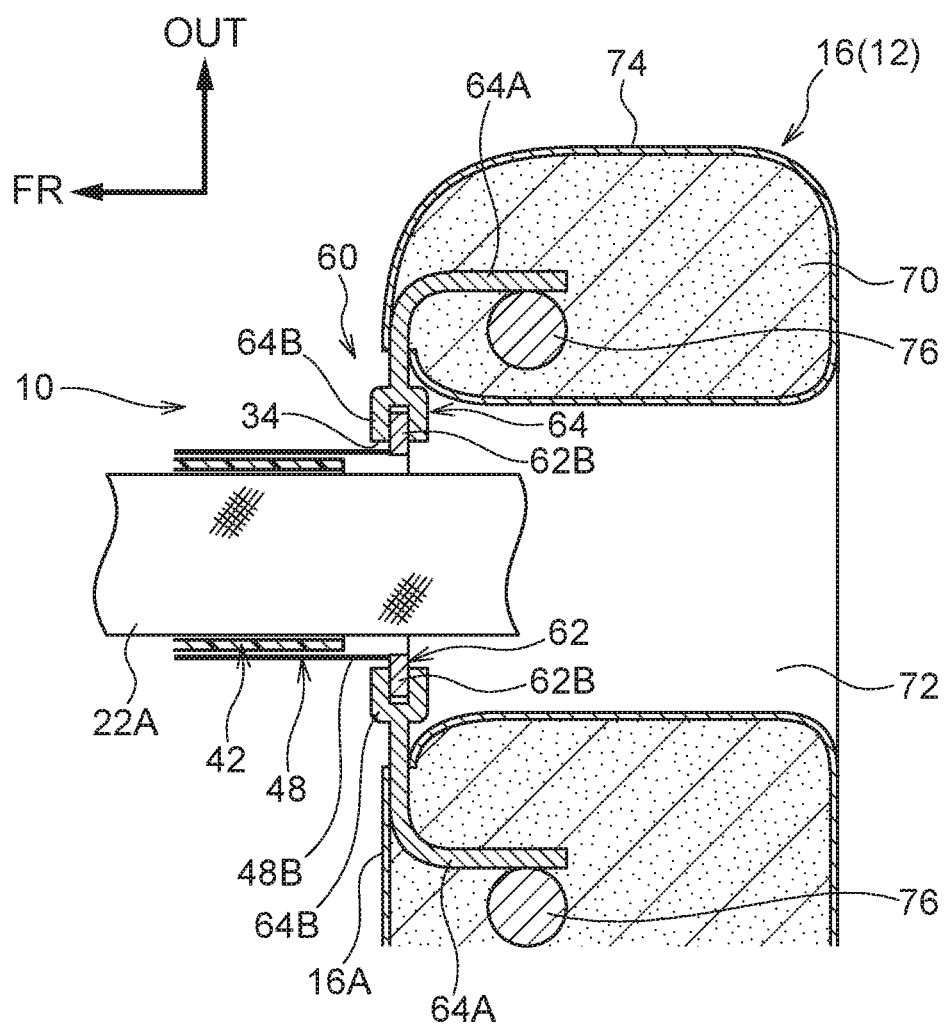
FIG. 6 is a magnified sectional diagram, cut along a horizontal direction, showing an attachment portion at which an upper end portion of the shoulder cover that is employed in the occupant restraint device for a vehicle according to the first exemplary embodiment is attached to be relatively movable in an up-and-down direction with respect to a seat back.

FIG. 6 shows a horizontal sectional diagram of the attachment portion 60 at which the side of the shoulder cover 40 at which the upper end portion 40A is disposed is attached to the seat back 16 to be relatively movable in the up-and-down direction with respect to the seat back 16. As shown in FIG. 6, a seat frame 76 and a seat pad 70 that is attached to the seat frame 76 are provided in the seat back 16. A penetrating portion 72 is provided in the seat pad 70 substantially along the front-and-rear direction of the seat 12. The shoulder belt portion 22A is inserted through the penetrating portion 72. A surface of the seat pad 70 is covered by a seat cover 74. The seat cover 74 is, for example, attached to the surface of the seat pad 70 by adhesion or the like.

The attachment portion 60 is provided with the slide plate 62 at which the upper end portion 48B of the cover 48 of the shoulder cover 40 is fixed. The slide plate 62 is structured by a single frame body with a substantially rectangular shape. The slide plate 62 is provided with an upper and lower pair of horizontal frame portions 62A (see FIG. 4) and a left and right pair of vertical frame portions 62B (see FIG. 6). In the first exemplary embodiment, the upper end portion 48B of the cover 48 is formed in a tube shape. The upper end portion 48B of the cover 48 is fixed to inner side edge portions of the slide plate 62. The attachment portion 60 is attached to an upper portion at the vehicle width direction outer side of the seat back 16, and is provided with guide members 64 that guide the slide plate 62 to be movable in the up-and-down direction.

Each guide member 64 is provided with an attachment plate 64A and a guide portion 64B. The attachment plates 64A are attached to the seat frame 76, which is disposed at both sides of the penetrating portion 72 of the seat back 16. The guide portions 64B are provided at end portions of the attachment plates 64A and sandwich edge portions of the vertical frame portions 62B of the slide plate 62 to be slidable in the up-and-down direction. The attachment plates 64A and guide portions 64B are disposed at both sides in the vehicle width direction of the penetrating portion 72 of the seat back 16. Each attachment plate 64A is formed in a substantial "L" shape in a sectional view cut along the vehicle width direction. One end portion of the attachment plate 64A is fixed to the seat frame 76 by a fastener that is not shown in the drawings. The guide portion 64B is provided at the other end portion of the attachment plate 64A and is formed in a substantial "U" shape in the sectional view cut along the vehicle width direction. The left and right pair of guide portions 64B slidably support the vertical frame portions 62B of the slide plate 62 from respective both sides thereof. Thus, the slide plate 62 is movable in the up-and-down direction. In the first exemplary embodiment, inner side edge portions of the guide portions 64B serve as the belt guide 34.

In the first exemplary embodiment, the guide member 64 is structured to allow the slide plate 62 to move in the up-and-down direction of the seat back 16 but not to move in the front-and-rear direction of the seat back 16. A length of the guide member 64 in the up-and-down direction is longer than a length of the slide plate 62 in the up-and-down direction. Thus, spaces for moving the slide plate 62 in the up-and-down direction are provided above and below the guide member 64. Although not shown in the drawings, an upper side stopper and a lower side stopper are provided at the attachment portion 60 to limit the movement range of the slide plate 62 in the up-and-down direction.

When the vehicle occupant P sitting on the seat 12 is putting on the seatbelt 22, the slide plate 62 fixed to the upper end portion 48B of the cover 48 of the shoulder cover 40 moves in the up-and-down direction in a state of being guided by the guide member 64 to adjust to the physique of the vehicle occupant P. Therefore, because the shoulder cover 40 moves in the up-and-down direction with respect to the seat back 16 to adjust to the position of the shoulder area S of the vehicle occupant P, the shoulder cover 40 closely fits itself to the shoulder area S of the vehicle occupant P (see FIG. 2 and FIG. 3). Hence, the hard pad 44 of the shoulder cover 40 is disposed in the region opposing the collarbone 92 of the vehicle occupant P.

—Operation and Effects—

Now, operation and effects of the occupant restraint device for a vehicle 10 according to the first exemplary embodiment are described.

In the occupant restraint device for a vehicle 10, the shoulder cover 40 through which the shoulder belt portion 22A is inserted and that is arranged along the restrained surface of the vehicle occupant P is provided at the upper portion at the width direction outer side of the seat back 16. The side of the shoulder cover 40 at which the upper end portion 40A is disposed is attached by the attachment portion 60 so as to be relatively movable in the up-and-down direction along the front face 16A at the upper portion at the width direction outer side of the seat back 16. Thus, in the state in which the vehicle occupant P sitting on the seat 12 is restrained by the seatbelt 22 (that is, when the vehicle occupant P is wearing the seatbelt 22), the side of the shoulder cover 40 at which the upper end portion 40A is disposed relatively moves in the up-and-down direction (for example, the direction of arrow X in FIG. 3), with respect to the front face 16A at the upper portion at the width direction outer side of the seat back 16, to adjust to the physique of the vehicle occupant P. Therefore, the shoulder cover 40 is disposed at a location opposing the shoulder area S of the vehicle occupant P sitting on the seat 12 (see FIG. 2 and FIG. 3). Furthermore, even if a sliding position of the seat 12 according to a seat sliding device (not shown in the drawings) is altered, the side of the shoulder cover 40 at which the upper end portion 40A is disposed relatively moves in the up-and-down direction, with respect to the front face 16A at the upper portion at the width direction outer side of the seat back 16, to adjust to the physique of the vehicle occupant P. Thus, the shoulder cover 40 may be disposed at a location opposing the shoulder area S of the vehicle occupant P.

The hard pad 44 is disposed inside the shoulder cover 40, between the vehicle occupant P sitting on the seat 12 and the shoulder belt portion 22A, in the region opposing the collarbone 92 of the vehicle occupant P (see FIG. 3). Therefore, during a frontal collision of the vehicle, a load from the shoulder belt portion 22A on the vehicle occupant P may be transmitted to the collarbone 92 that has relatively high endurance via the hard pad 44, and a load on the ribs 94 that have relatively lower endurance than the collarbone 92 may be moderated. Consequently, an occurrence of chest deflection (in other words, rib deflection), in which the vicinity of the ribs 94 of the vehicle occupant P deforms, is suppressed or prevented. In addition in the occupant restraint device for a vehicle 10, a load may continue to be transmitted to the collarbone 92 of the vehicle occupant P until a latter half of the collision, regardless of a sliding position of the seat 12 according to the seat sliding device (not shown in the drawings), the physique of the vehicle occupant P and the like.

Thus, with the occupant restraint device for a vehicle 10, an applied load acting on the ribs 94 of the vehicle occupant P from the side thereof at which the shoulder belt portion 22A is disposed during a frontal collision may be moderated.

In the occupant restraint device for a vehicle 10, the soft pad 46 that is softer than the hard pad 44 is provided inside the shoulder cover 40, at least between the vehicle occupant P sitting on the seat 12 and the hard pad 44. That is, because the soft pad 46 is interposed between the vehicle occupant P and the hard pad 44, comfort when the vehicle occupant P is wearing the seatbelt 22 is improved.

In the occupant restraint device for a vehicle 10, the soft pad 46 is provided with the rear side elongated portion 46B that is elongated along the shoulder belt portion 22A in the thickness direction of the shoulder cover 40 so as to cover the side of the shoulder belt portion 22A at which the shoulder area S of the vehicle occupant P sitting on the seat 12 is disposed. Therefore, because the rear side elongated portion 46B of the soft pad 46 is interposed between the shoulder belt portion 22A and the shoulder area S of the vehicle occupant P in the thickness direction of the shoulder cover 40, comfort when the vehicle occupant P is wearing the seatbelt 22 is even further improved.

In the occupant restraint device for a vehicle 10, the soft pad 46 is also provided with the inner side elongated portion 46C that is elongated along the shoulder belt portion 22A in the width direction of the shoulder cover 40 so as to cover the side of the shoulder belt portion 22A at which the neck N of the vehicle occupant P sitting on the seat 12 is disposed. Therefore, because the inner side elongated portion 46C of the soft pad 46 is interposed between the shoulder belt portion 22A and the neck N of the vehicle occupant P in the width direction of the shoulder cover 40, comfort when the vehicle occupant P is wearing the seatbelt 22 is even further improved.

In the occupant restraint device for a vehicle 10, the attachment portion 60 includes the slide plate 62 at which the upper end portion 40A of the shoulder cover 40 is fixed to be slidable in the up-and-down direction with respect to the seat back 16. That is, the slide plate 62 at which the upper end portion 40A of the shoulder cover 40 is fixed slides in the up-and-down direction along the guide members 64 provided in the seat back 16. Therefore, when the vehicle occupant P puts on the seatbelt 22, the slide plate 62 at the side of the shoulder cover 40 at which the upper end portion 40A is disposed slides in the up-and-down direction with respect to the seat back 16, adjusting to the physique of the vehicle occupant P, and the shoulder cover 40 is disposed at a location opposing the shoulder area S of the vehicle occupant P. Thus, the shoulder cover 40 may be set to a position suitable for restraint of the vehicle occupant P (that is, a position at which the hard pad 44 opposes the collarbone 92 of the vehicle occupant P) by a simple structure (see FIG. 3).

In the occupant restraint device for a vehicle 10, the hard pad 44 is provided with the plural slits 44A arrayed in the length direction of the shoulder belt portion 22A. The plural slits 44A are provided at the side of the hard pad 44 at which the vehicle occupant P sitting on the seat 12 is disposed. The width of each slit 44A in the length direction of the shoulder belt portion 22A gradually increases from the side thereof at which the shoulder belt portion 22A is disposed toward the side at which the vehicle occupant P is disposed. Therefore, the hard pad 44 easily inflects along the vehicle occupant P sitting on the seat 12 by the hard pad 44 deforming so as to reduce the widths of the plural slits 44A, and the hard pad 44 is likely to closely fit to the vehicle occupant P. Thus, the hard pad 44 is more assuredly disposed in the region opposing the collarbone 92 of the vehicle occupant P, and fitting performance of the seatbelt 22 is improved.

Figure 11:
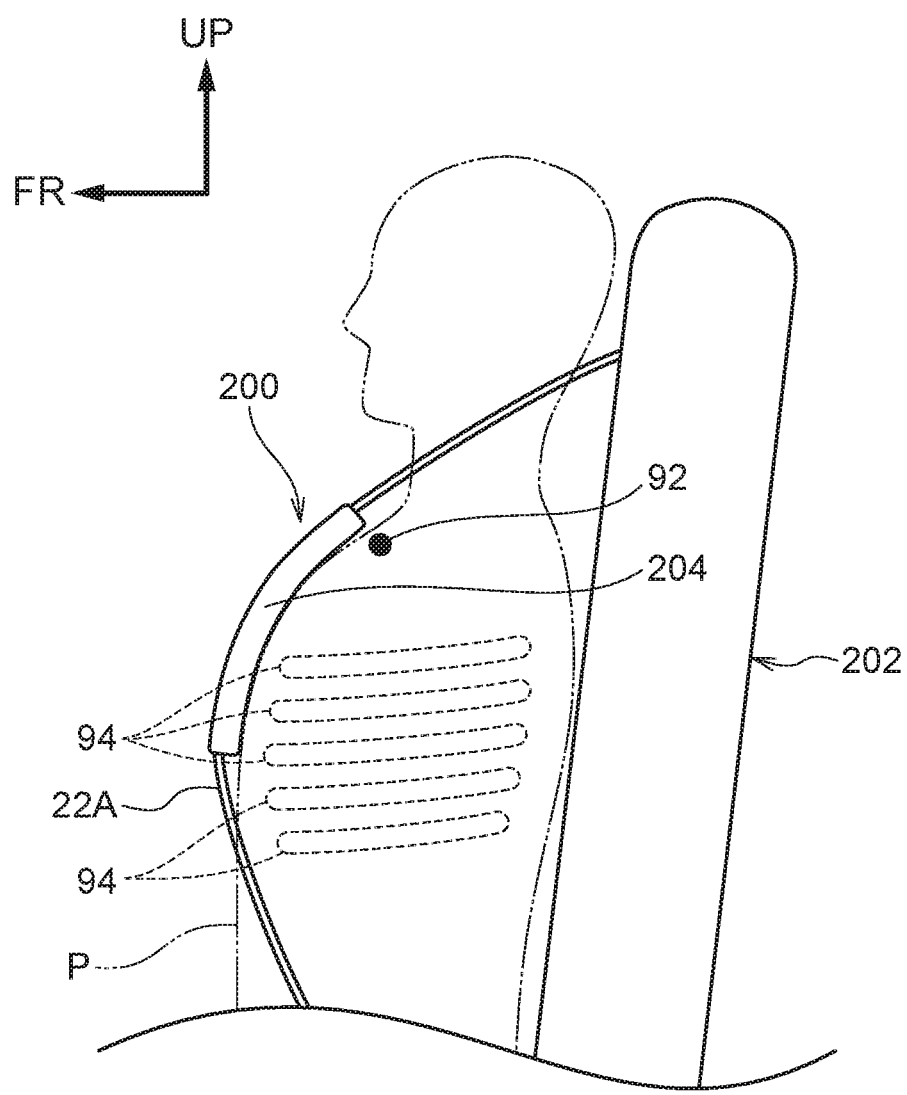
FIG. 11 is a side view showing a state during a frontal collision in which an airbag that is integral with a shoulder belt of an occupant restraint device for a vehicle according to a comparative example is inflated at a location opposing the chest area of a vehicle occupant.
Figure 12:
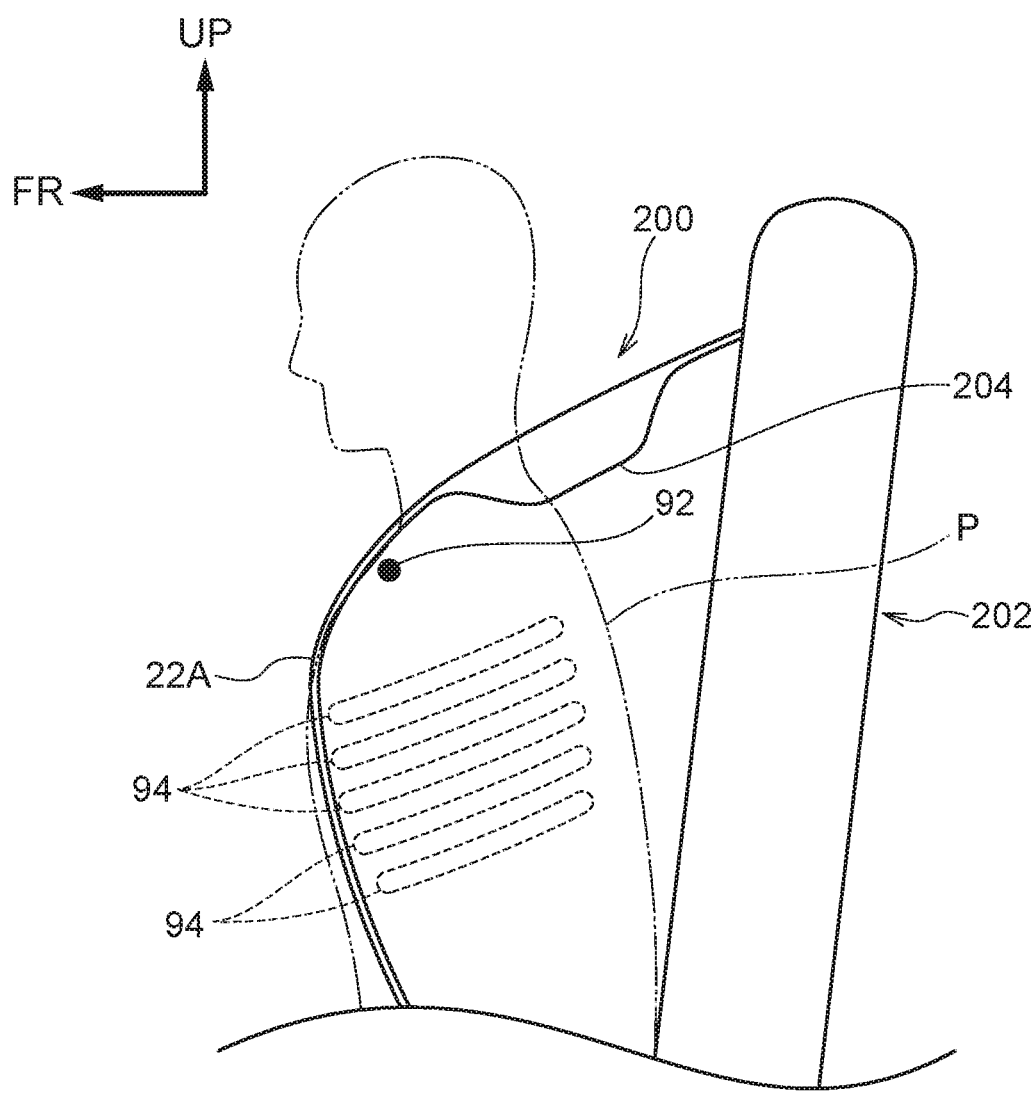
FIG. 12 is a side view showing a state during a frontal collision in which the airbag that is integral with the shoulder belt of the occupant restraint device for a vehicle according to the comparative example is inflated at the rear side of the shoulder area of a vehicle occupant.

FIG. 11 and FIG. 12 show schematic structural diagrams of an occupant restraint device for a vehicle 200 according to a comparative example. As shown in FIG. 11 and FIG. 12, the occupant restraint device for a vehicle 200 is provided with an airbag 204 that is integral with the shoulder belt portion 22A at an upper portion in the up-and-down direction of the shoulder belt portion 22A. In the occupant restraint device for a vehicle 200, when a frontal collision is detected by a sensor that is not shown in the drawings, gas is introduced into the airbag 204 and the airbag 204 inflates.

As shown in FIG. 11, depending on a sliding position of a seat 202, the physique of a vehicle occupant P sitting on the seat 202 and the like, the airbag 204 of the occupant restraint device for a vehicle 200 according to the comparative example may be disposed at a location opposing the chest area of the vehicle occupant P. During a frontal collision in this situation, the airbag 204 inflates at the location opposing the chest area of the vehicle occupant P, and the airbag 204 presses against the ribs 94 of the vehicle occupant P.

Alternatively, as shown in FIG. 12, depending on the sliding position of the seat 202, the physique of a vehicle occupant P sitting on the seat 202 and the like, the airbag 204 of the occupant restraint device for a vehicle 200 according to the comparative example may be disposed at the rear side of the vehicle occupant P. During a frontal collision in this situation, the airbag 204 inflates at the rear side of the shoulder area of the vehicle occupant P, and the airbag 204 cannot press against the shoulder area of the vehicle occupant P.

Therefore, in the occupant restraint device for a vehicle 200 according to the comparative example, even though the airbag 204 inflates during a frontal collision, it is difficult to reliably transmit a load from the airbag 204 to the collarbone 92 of the vehicle occupant P.

In contrast, in the occupant restraint device for a vehicle 10 according to the first exemplary embodiment, when the vehicle occupant P sitting on the seat 12 puts on the seatbelt 22, the side of the shoulder cover 40 at which the upper end portion 40A is disposed relatively moves in the up-and-down direction with respect to the front face 16A, at the upper portion at the width direction outer side of the seat back 16, to adjust to the physique of the vehicle occupant P. As a result, the shoulder cover 40 is disposed at a location opposing the shoulder area S of the vehicle occupant P sitting on the seat 12. Thus, during a frontal collision, a load from the shoulder belt portion 22A against the vehicle occupant P may be transmitted via the hard pad 44 to the collarbone 92 that has higher endurance.

Second Exemplary Embodiment

Figure 7:
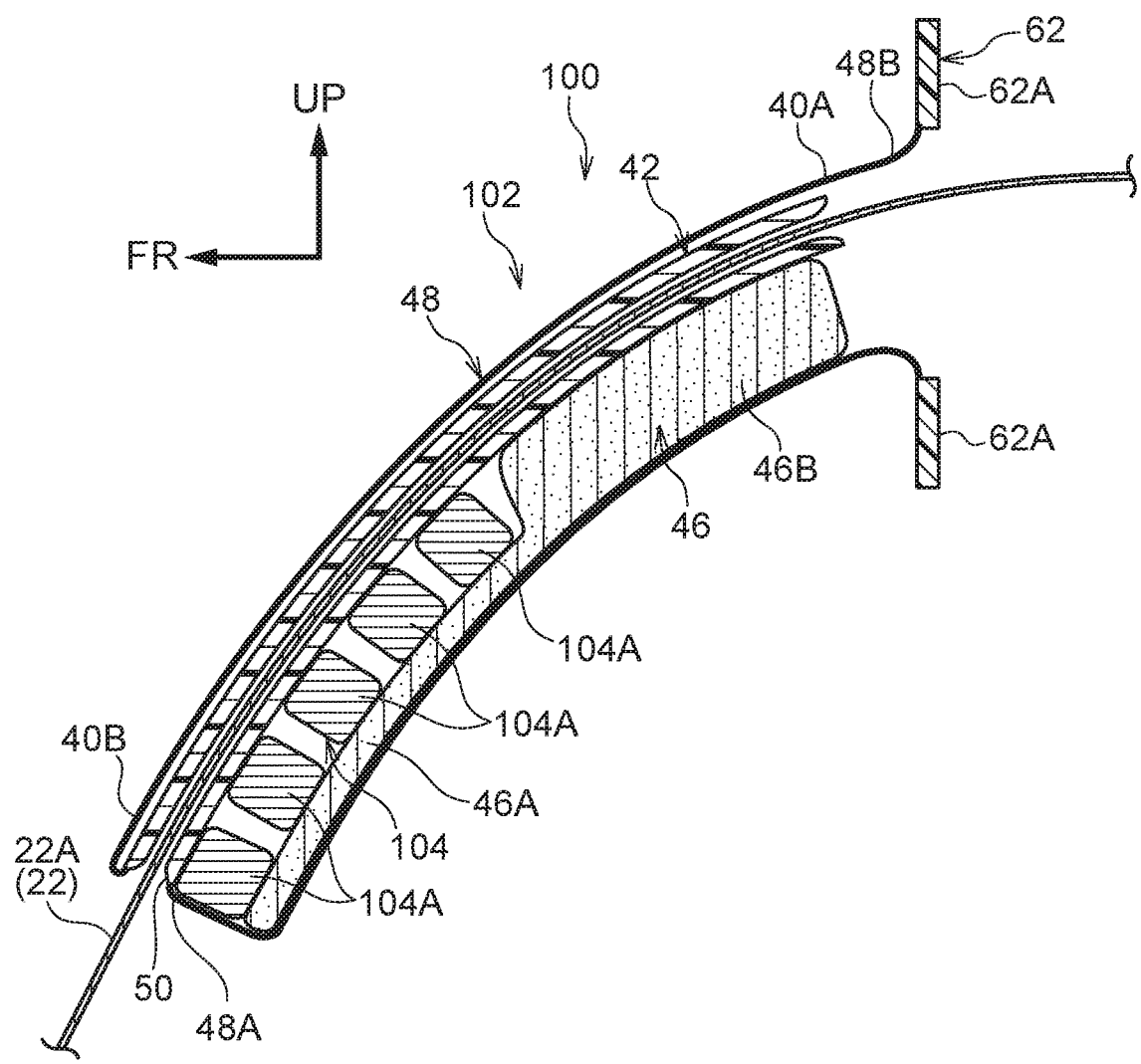
FIG. 7 is a sectional diagram corresponding to FIG. 4, cut along the length direction of a shoulder belt, showing a shoulder cover that is employed in an occupant restraint device for a vehicle according to a second exemplary embodiment.

FIG. 7 shows a shoulder cover 102 employed at an occupant restraint device for a vehicle 100 according to a second exemplary embodiment. Structural portions that are the same as in the first exemplary embodiment described above are assigned the same reference numerals, and descriptions thereof are not given.

As shown in FIG. 7, a hard pad 104 is provided inside the shoulder cover 102 of the occupant restraint device for a vehicle 100. The hard pad 104 is disposed between a vehicle occupant P sitting on a seat (not shown in the drawing) and the shoulder belt portion 22A (which is to say, the belt insertion portion 42). The hard pad 104 is arranged from an intermediate portion to a front side region of the shoulder cover 102 substantially in the vehicle front-and-rear direction, and is disposed in the region opposing the collarbone 92 (not shown in the drawing) of the vehicle occupant P sitting on the seat.

The hard pad 104 is plurally divided in the length direction of the shoulder belt portion 22A. More specifically, the hard pad 104 is provided with a plural number of divided portions 104A that are divided apart in the length direction of the shoulder belt portion 22A. In the second exemplary embodiment, spaces (gaps) are provided between the neighboring divided portions 104A. The plural divided portions 104A of the hard pad 104 are, for example, joined to the belt insertion portion 42 by adhesion or the like such that positions of the divided portions 104A inside the shoulder cover 102 do not shift.

In the occupant restraint device for a vehicle 100 described above, because the hard pad 104 is provided with the plural divided portions 104A that are divided apart in the length direction of the shoulder belt portion 22A, the hard pad 104 easily inflects along the restrained surface of the vehicle occupant P sitting on the seat (not shown in the drawing). Therefore, the hard pad 104 closely fits to the vehicle occupant P. Consequently, the hard pad 104 is more assuredly disposed in a region opposing the collarbone 92 (not shown in the drawings) of the vehicle occupant P, and fitting performance of the seatbelt 22 is improved.

In the occupant restraint device for a vehicle 100 described above, during a frontal collision of the vehicle, a load from the shoulder belt portion 22A against the vehicle occupant P may be transmitted via the hard pad 104 to the collarbone 92 that has higher endurance, and a load on the ribs 94 (not shown in the drawing) that have relatively lower endurance than the collarbone 92 may be moderated.

Third Exemplary Embodiment

Figure 8A:
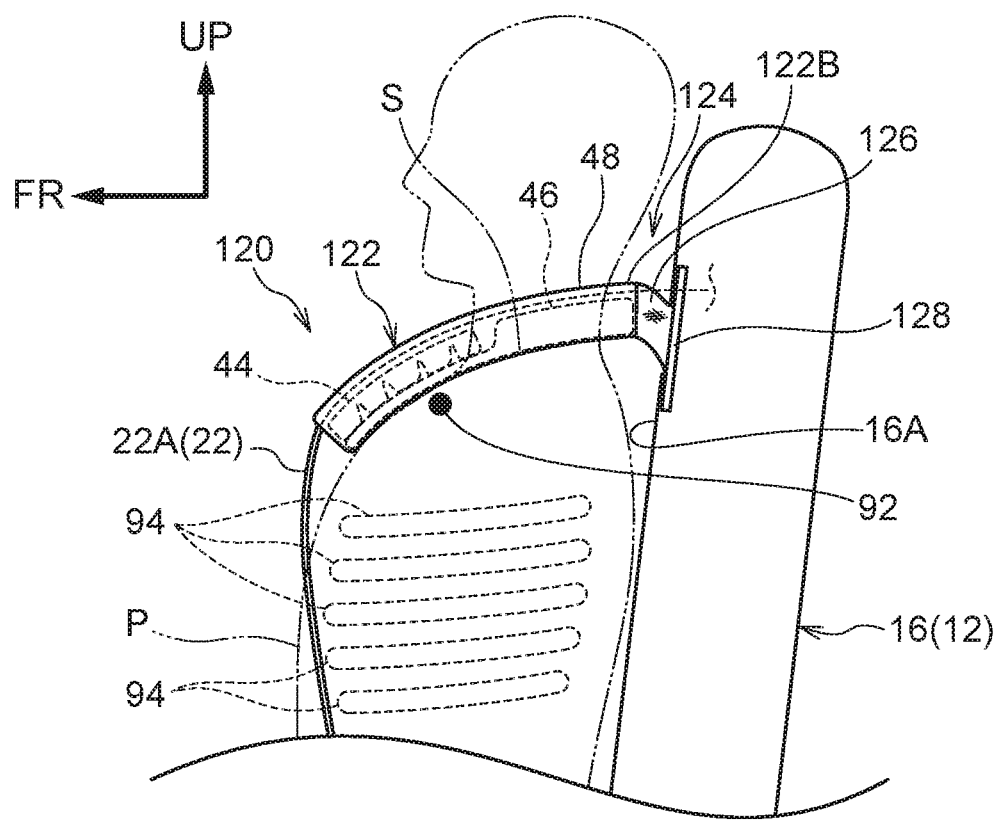
FIG. 8A is a side view showing a first state of extension of an extensible member at a terminal portion side of a shoulder cover that is employed in an occupant restraint device for a vehicle according to a third exemplary embodiment.
Figure 8B:
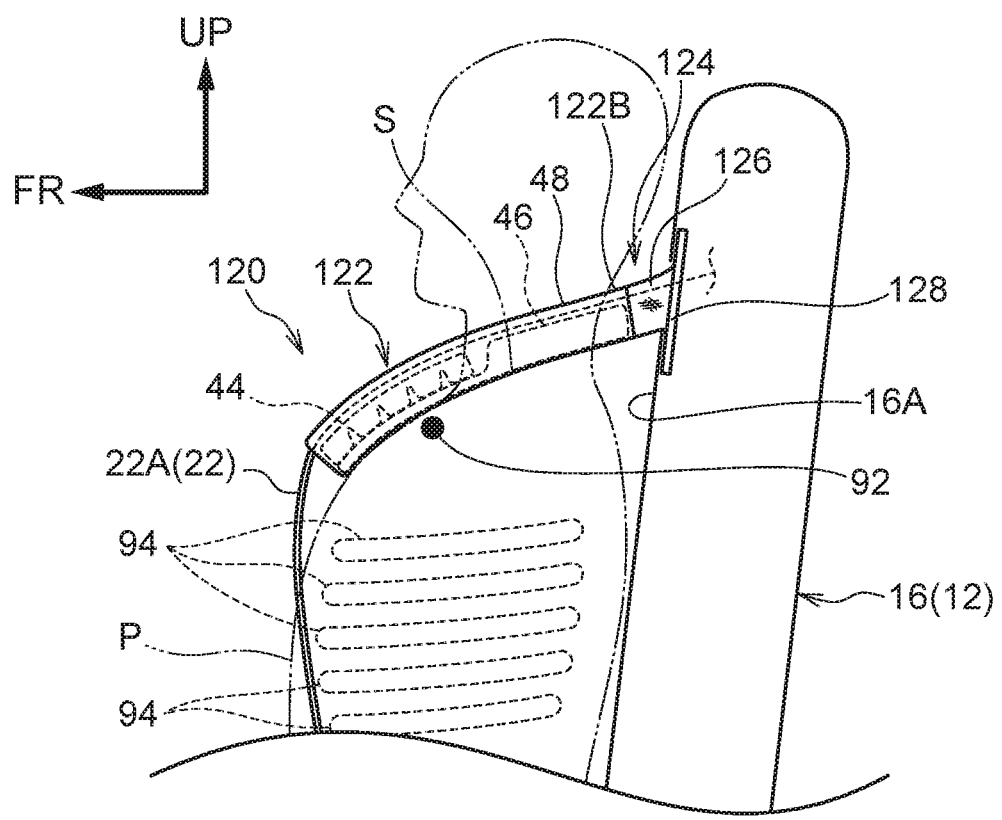
FIG. 8B is a side view showing a second state of extension of the extensible member at the terminal portion side of the shoulder cover that is employed in the occupant restraint device for a vehicle according to the third exemplary embodiment.
Figure 9:
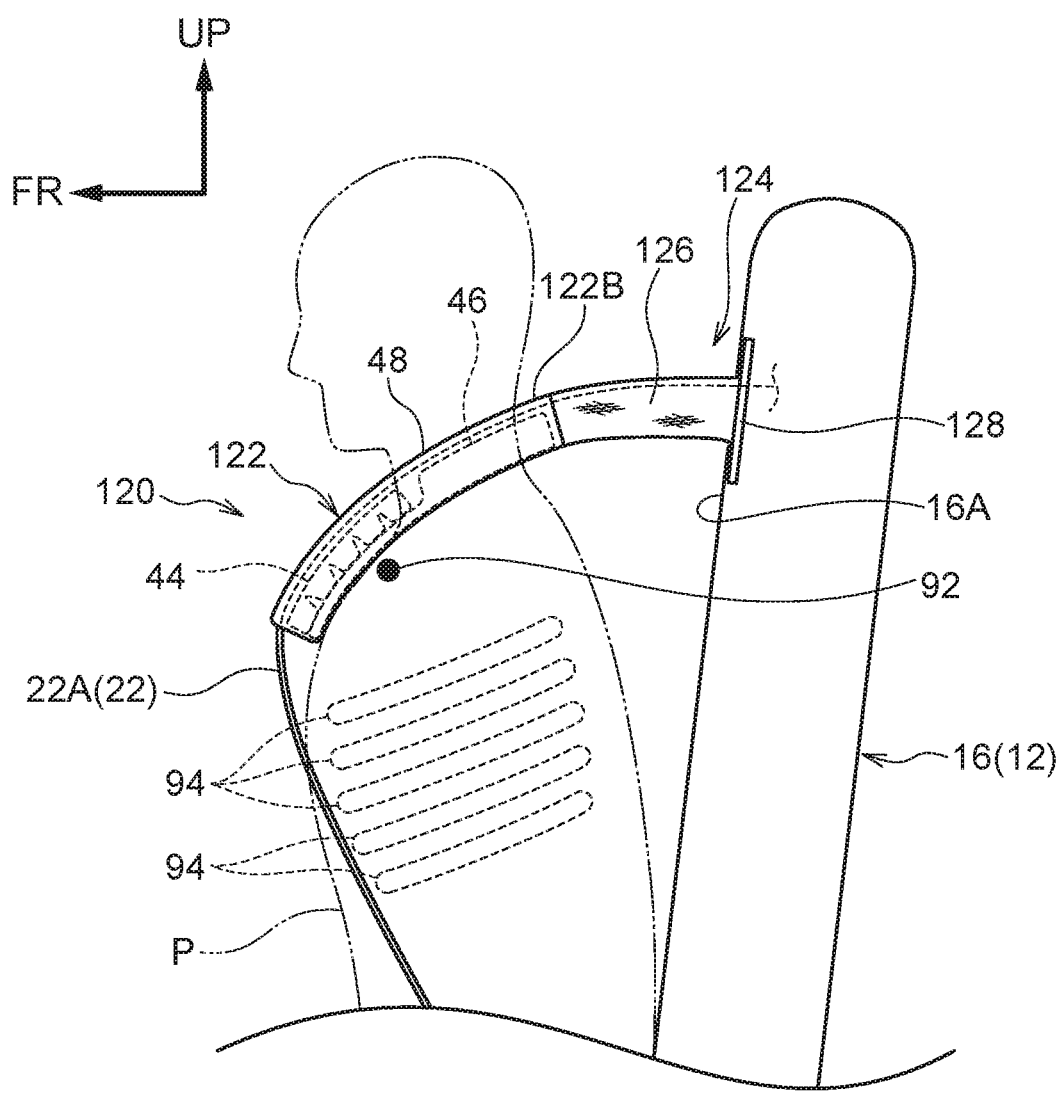
FIG. 9 is a side view showing a state of the extensible member at the terminal portion side of the shoulder cover of the occupant restraint device for a vehicle according to the third exemplary embodiment during a frontal collision.

FIG. 8A to FIG. 9 show a shoulder cover 122 employed at an occupant restraint device for a vehicle 120 according to a third exemplary embodiment. Structural portions that are the same as in the first and second exemplary embodiments described above are assigned the same reference numerals, and descriptions thereof are not given.

As shown in FIG. 8A and FIG. 8B, the occupant restraint device for a vehicle 120 is provided with the shoulder cover 122 at an upper portion at the vehicle width direction outer side of the seat back 16. The shoulder belt portion 22A is inserted through the shoulder cover 122, and the shoulder cover 122 is arranged along the restrained surface of a vehicle occupant P sitting on the seat 12. The occupant restraint device for a vehicle 120 is further provided with an attachment portion 124 at which a side of the shoulder cover 122 at which an upper end portion 122B serving as the terminal portion is disposed is attached so as to be relatively movable in the up-and-down direction along the front face 16A of the upper portion at the vehicle width direction outer side of the seat back 16. The attachment portion 124 fixes the side of the shoulder cover 122 at which the upper end portion 122B is disposed to the front face 16A of the upper portion at the width direction outer side of the seat back 16, via an extensible member 126 that is more extensible than the shoulder cover 122. In the third exemplary embodiment, the extensible member 126 is formed of a cloth that is easier to stretch than the cover 48 of the shoulder cover 122.

In the occupant restraint device for a vehicle 120, an end portion at the opposite side of the shoulder cover 122 from the side at which the extensible member 126 is disposed is attached to a plate 128. The plate 128 is fixed to the upper portion at the width direction outer side of the seat back 16. That is, the plate 128 is fixed to the upper portion at the width direction outer side of the seat back 16 using a fastener that is not shown in the drawings, and the plate 128 does not move in the up-and-down direction with respect to the seat back 16.

As shown in FIG. 8A and FIG. 8B, when a vehicle occupant P sitting on the seat 12 is putting on the seatbelt 22, the extensible member 126 is extended to adjust to the physique of the vehicle occupant P. Thus, the side of the shoulder cover 122 at which the upper end portion 122B is disposed relatively moves in the up-and-down direction with respect to the front face 16A at the upper portion at the width direction outer side of the seat back 16. That is, by the extensible member 126 being extended, the shoulder cover 122 adjusts to a location of the shoulder area S of the vehicle occupant P sitting on the seat 12 and the shoulder cover 122 closely fits itself to the shoulder area S of the vehicle occupant P. Hence, the hard pad 44 of the shoulder cover 122 is disposed in the region opposing the collarbone 92 of the vehicle occupant P.

In the occupant restraint device for a vehicle 120 described above, the side of the shoulder cover 122 at which the upper end portion 122B is disposed is fixed to the front face 16A at the upper portion at the width direction outer side of the seat back 16 via the extensible member 126 that is more extensible than the shoulder cover 122. Therefore, when the vehicle occupant P is putting on the seatbelt 22, the shoulder cover 122 adjusts to the physique of the vehicle occupant P by the extensible member 126 being extended, and the shoulder cover 122 is disposed at a location opposing the shoulder area S of the vehicle occupant P. Thus, the shoulder cover 122 may be set to a position suitable for restraint of the vehicle occupant P (that is, a position at which the hard pad 44 opposes the collarbone 92 of the vehicle occupant P) by a simple structure.

In the occupant restraint device for a vehicle 120, as shown in FIG. 9, during a frontal collision of the vehicle, the shoulder belt portion 22A is pulled in accordance with forward or rearward movement of the vehicle occupant P, and the extensible member 126 is extended further in accordance with the length of the shoulder belt portion 22A. Therefore, shifting of the position of the shoulder cover 122 relative to the vehicle occupant P is suppressed and the shoulder cover 122 is kept at the location opposing the shoulder area S of the vehicle occupant P. Consequently, in the occupant restraint device for a vehicle 120, a load from the shoulder belt portion 22A against the vehicle occupant P during a frontal collision of the vehicle may be transmitted via the hard pad 44 to the collarbone 92 that has higher endurance, and a load on the ribs 94 that have relatively lower endurance than the collarbone 92 may be moderated.

Variant Examples

Figure 10:
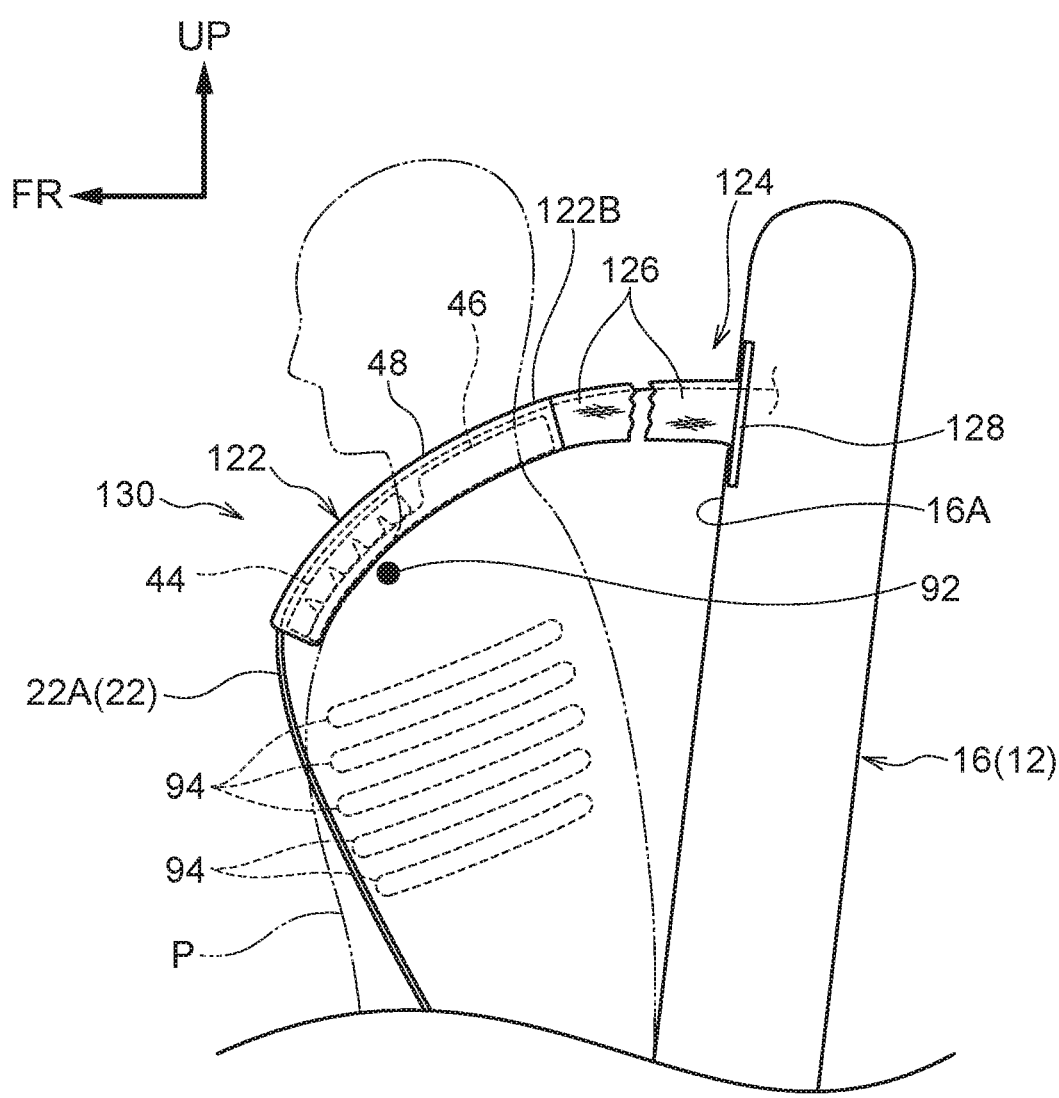
FIG. 10 is a side view showing a state of an extensible member at a terminal portion side of a shoulder cover of an occupant restraint device for a vehicle according to a variant example during a frontal collision.

FIG. 10 shows the shoulder cover 122 being employed at an occupant restraint device for a vehicle 130 according to a variant example. In the occupant restraint device for a vehicle 130, as shown in FIG. 10, the extensible member 126 is constituted to be ruptured by an impact during a frontal collision of the vehicle. As a result, shifting of the shoulder cover 122 relative to the vehicle occupant P is suppressed, and the shoulder cover 122 is kept at a location opposing the shoulder area S of a vehicle occupant P. Consequently, in the occupant restraint device for a vehicle 130, a load from the shoulder belt portion 22A against the vehicle occupant P during a frontal collision of the vehicle may be transmitted via the hard pad 44 to the collarbone 92 that has higher endurance, and a load on the ribs 94 that have relatively lower endurance than the collarbone 92 may be moderated.

In the first to third exemplary embodiments, the hard pad 44 is provided with the plural slits 44A with inverted "V" shapes. The shape and number of the slits 44A may be modified. For example, plural slits arrayed in the length direction of the shoulder belt portion may be provided in the hard pad, and the widths of the slits may be substantially constant from the side thereof at which the vehicle occupant P is disposed toward the side at which the belt insertion portion 42 is disposed. In this case, the hard pad may be inflected along the restrained surface of the vehicle occupant P by the widths of the plural slits in the hard pad being increased.

In the second exemplary embodiment, the hard pad 104 is plurally divided; the shape, spacing and number of the divided portions 104A may be modified.

In the first to third exemplary embodiments, the rear side elongated portion 46B of the soft pad 46 has substantially the same thickness along the length direction of the shoulder belt portion 22A, but the present disclosure is not limited thus. For example, a rear side elongated portion of a soft pad may be formed with the thickness thereof gradually decreasing toward the rear side along the length direction of a shoulder belt portion.

In the first to third exemplary embodiments, the tube-shaped belt insertion portion 42 through which the shoulder belt portion 22A is inserted is provided, but the present disclosure is not limited thus. For example, provided the belt insertion portion is a structure that slides in the length direction of the shoulder belt portion 22A, structures other than tube shapes are possible. For example, a structure is possible in which low-friction sheet-shaped members are disposed at an upper side and a lower side of the shoulder belt portion 22A. Further, a structure is possible in which the retractor 26 with the pretensioner function is mounted at the seat back 16.

Specific exemplary embodiments of the present disclosure have been described in detail, but the present disclosure is not to be limited to the present exemplary embodiments and it will be clear to the ordinary practitioner that numerous alternative embodiments are possible within the technical scope of the invention.

The disclosures of Japanese Patent Application No. 2017-196650 filed Oct. 10, 2017 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

What is claimed is:

1. An occupant restraint device for a vehicle, comprising:
a three-point seatbelt device including a shoulder belt that extends from an upper portion at a seat width direction one end side of a seat back toward a buckle at a lower portion at a seat width direction other end side of the seat back, the seat back structuring a vehicle seat on which a vehicle occupant is to sit;
a shoulder cover provided at the upper portion at the seat width direction one end side of the seat back, the shoulder belt being inserted through the shoulder cover, and the shoulder cover being configured to be arranged along a restrained surface of the vehicle occupant sitting on the vehicle seat;
an attachment portion, at which a side of the shoulder cover that includes a terminal portion of the shoulder cover is disposed, is attached to the upper portion at the seat width direction one end side of the seat back such that the terminal portion is relatively movable in an up-and-down direction with respect to the upper portion while the vehicle occupant is sitting on the vehicle seat and wearing the seatbelt device; and
a hard pad provided inside the shoulder cover, the hard pad being configured to be disposed between the vehicle occupant sitting on the vehicle seat and the shoulder belt in a region opposing a collarbone of the vehicle occupant; and
a soft pad inside the shoulder cover, the soft pad being configured to be disposed at least between the vehicle occupant sitting on the vehicle seat and the hard pad, and the soft pad being softer than the hard pad, wherein
the soft pad includes an inner side elongated portion that is elongated along the shoulder belt and extends only to the inner side in a width direction of the shoulder cover so as to cover a side of the shoulder belt at which a neck of the vehicle occupant sitting on the vehicle seat is disposed.

2. The occupant restraint device for a vehicle according to claim 1, wherein the soft pad includes a rear side elongated portion that is elongated along the shoulder belt in a thickness direction of the shoulder cover so as to cover a side of the shoulder belt at which a shoulder area of the vehicle occupant sitting on the vehicle seat is disposed.

3. The occupant restraint device for a vehicle according to claim 1, wherein:
the inner side elongated portion is elongated from the main body portion so as to wrap around to the vehicle width direction inner side of the hard pad and a tube-shaped belt insertion portion provided in the shoulder cover through which the shoulder belt is inserted.

4. The occupant restraint device for a vehicle according to claim 1, wherein the attachment portion includes a slide plate at which the terminal portion of the shoulder cover is fixed to be slidable in the up-and-down direction with respect to the seat back.

5. The occupant restraint device for a vehicle according to claim 1, wherein the attachment portion fixes the side of the shoulder cover at which the terminal portion is disposed to the upper portion at the seat width direction one end side of the seat back via a member that is more extensible than the shoulder cover.

6. The occupant restraint device for a vehicle according to claim 1, wherein the hard pad includes a plurality of slits arrayed in a length direction of the shoulder belt so as to be capable of inflecting along the vehicle occupant sitting on the vehicle seat.

7. The occupant restraint device for a vehicle according to claim 1, wherein the hard pad is plurally divided in a length direction of the shoulder belt so as to be capable of inflecting along the vehicle occupant sitting on the vehicle seat.

8. The occupant restraint device for a vehicle according to claim 6, wherein
the plurality of slits are provided at a side of the hard pad at which the vehicle occupant sitting on the vehicle seat is disposed; and
the plurality of slits are formed in an inverted V-shape in which a width of each slit in the length direction of the shoulder belt gradually increases from a side thereof at which the shoulder belt is disposed toward a side thereof at which the vehicle occupant sitting on the vehicle seat is disposed.

9. The occupant restraint device for a vehicle according to claim 1, wherein the hard pad and the soft pad are joined, by adhesion, to a tube-shaped belt insertion portion provided inside the shoulder cover and through which the shoulder belt is inserted.

10. The occupant restraint device for a vehicle according to claim 1, wherein the terminal portion is relatively moveable in the up-and-down direction with respect to the upper portion along a front surface of the upper portion.

11. The occupant restraint device for a vehicle according to claim 10, wherein the terminal portion of the shoulder cover is configured not to move in a front-and-rear direction of the seat back.

12. The occupant restraint device for a vehicle according to claim 1, further comprising a tube-shaped belt insertion portion provided inside the shoulder cover and through which the shoulder belt is inserted.

13. The occupant restraint device for a vehicle according to claim 12, wherein the hard pad is arranged from the middle portion of the shoulder cover in a seat back front-and-rear direction to a front side portion of the shoulder cover in the seat back front-and-rear direction.

14. The occupant restraint device for a vehicle according to claim 13, wherein the soft pad includes:
a thin main body portion configured to be interposed between the vehicle occupant sitting on the vehicle seat and the hard pad; and
a rear side elongated portion that extends from the main body portion along the shoulder belt in a thickness direction of the shoulder cover to cover a shoulder side of the vehicle occupant sitting on the vehicle seat.

15. The occupant restraint device for a vehicle according to claim 12, wherein:
the shoulder cover includes a bag-shaped cover that encloses the belt insertion portion, the hard pad, and the soft pad; and
the terminal portion of the shoulder cover is fixed to a slide plate that forms a portion of the attachment portion.

16. The occupant restraint device for a vehicle according to claim 15, wherein the slide plate moves in an up-and-down direction while being guided by a guide member.

* * * * *